United States Patent [19]

Gard

[11] Patent Number: 4,916,648

[45] Date of Patent: Apr. 10, 1990

[54] ULTRASONIC LOGGING APPARATUS WITH IMPROVED RECEIVER

[75] Inventor: Michael F. Gard, Plano, Tex.

[73] Assignee: Atlantic Richfield Company, Los Angeles, Calif.

[21] Appl. No.: 366,201

[22] Filed: Jun. 9, 1989

Related U.S. Application Data

[63] Continuation of Ser. No. 291,627, Dec. 29, 1988, abandoned.

[51] Int. Cl.⁴ .............................................. G01V 1/00
[52] U.S. Cl. ....................................... 367/35; 367/25; 367/911; 181/105
[58] Field of Search .................. 181/104, 105, 108; 367/911, 37, 35, 25, 26, 27, 65, 98; 73/151, 152; 175/40, 50

[56] References Cited

U.S. PATENT DOCUMENTS

| | | | |
|---|---|---|---|
| 3,553,640 | 1/1971 | Zemanek | 181/104 |
| 4,254,481 | 3/1981 | Smither et al. | 367/80 |
| 4,691,307 | 9/1987 | Rambow | 367/69 |
| 4,837,753 | 6/1989 | Morris et al. | 367/69 |

Primary Examiner—Charles T. Jordan
Assistant Examiner—J. Woodrow Eldred
Attorney, Agent, or Firm—Geoffrey A. Mantooth

[57] ABSTRACT

An ultrasonic logging apparatus is provided with a receiver for receiving acoustic returns of varying amplitudes and a digitizer for digitizing the acoustic returns. The receiver utilizes the same transducer as the transmitter, and has input switching protection to protect the amplifiers from the transmitter signal. The receiver amplifiers have gain switching, utilizing junction field-effect transistors to produce rapid gain switching during an acoustic return. The gain switching allows the digitizer to digitize with satisfactory resolution.

7 Claims, 4 Drawing Sheets

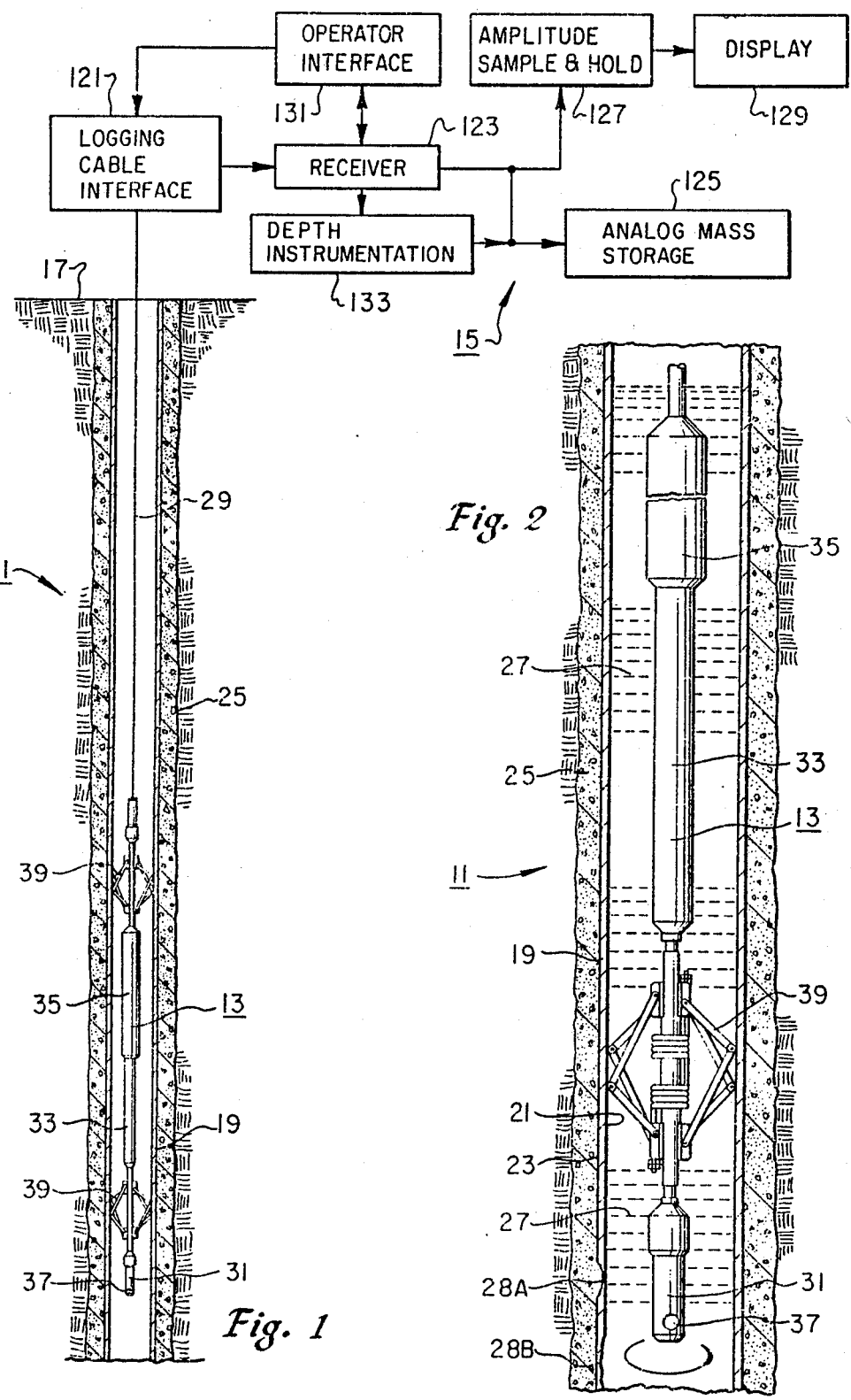

ULTRASONIC LOGGING APPARATUS WITH IMPROVED RECEIVER

This is a continuation of co-pending application Ser. No. 291,627, filed Dec. 29, 1988, now abandoned.

FIELD OF THE INVENTION

The present invention relates to ultrasonic logging apparatuses such as are used in well boreholes, and more particularly to the receivers in the ultrasonic logging apparatuses, which receivers receive the acoustic returns generated by the ultrasonic logging apparatuses.

BACKGROUND OF THE INVENTION

Zemanek, U.S. Pat. No. 3,369,626 discloses an ultrasonic tool for use in scanning the inner surface of an open well borehole or of casing in a borehole. The tool, which is commercially known as the "borehole televiewer", creates a high resolution picture of the inner surface under investigation. The borehole televiewer is used to "see" the inner surface under investigation through drilling mud or other borehole fluids. In an open borehole, the borehole televiewer provides a picture of the formations surrounding the borehole. In a cased borehole, the borehole televiewer provides a picture of the inner surface of the casing, which can be used to determine the condition of the inner surface.

The borehole televiewer uses a rotating ultrasonic transducer. The transducer serves as a transmitter, to generate acoustic waveforms, and a receiver, to receive the acoustic return. The acoustic return is caused by the reflection of the generated acoustic waveform from the inner surface under investigation. The acoustic return has two measured parameters, the time of travel of the acoustic return and the amplitude envelope, which give an indication of the condition of the investigated surface.

The transducer rotates about three revolutions per second, is pulsed about 500 times per revolution, and is pulled up the borehole at a speed of about 5 feet per second. The ultrasonic transducer spot size, the rotational speed, the pulse repetition rate, and the vertical speed combine to provide full coverage of the investigated inner surface, resulting in high areal resolution of the inner surface.

In the borehole televiewer, the acoustic return is converted into a voltage by the transducer and sent to the receiver. The receiver, which is located downhole inside of the borehole televiewer, has a resistive network for attenuating the signal. It is believed that one of the primary functions of the attenuation resistive network is the protection of the receiver electronics during the high voltage excitation waveform which is used to generate an acoustic waveform from the transducer during the transmit period. Because the same transducer is shared by the transmitter and the receiver, some type of input protection for the receiver is necessary. However, use of an attenuation resistive network reduces the overall signal-to-noise ratio and requires additional amplifier gain in order to compensate for the attenuation.

Another disadvantage in the prior art receiver lies in the use of a bulky electromechanical rotary switch to change the attenuation, and therefore the gain of the receiver. The switch setting is selectable by an operator on the surface. The operator issues commands to the electromechanical rotary switch. The commands are sent down to the switch over the logging cable. As the switch rotates through its various combinations, the operator determines the most suitable setting for the well being logged. A relatively large amount of time is required to change attenuation setting, with the result being that the same receiver gain must be utilized for several acoustic returns and gain switching between parts of an individual return sequence is impossible. Yet, the acoustic returns obtained during a single attenuation setting may differ considerably in amplitude. Acoustic returns from relatively close inner surfaces will have a larger amplitude than acoustic returns from more remote inner surfaces. Rapid changes in amplitude are encountered at or near the edges of pits, holes, or corroded areas. It is unlikely that the operator will be able to identify a single gain setting that would provide satisfactory resolution of signals from both close and remote inner surfaces. Thus, there frequently arises the situation where a suboptimal log of the investigated inner surface is obtained. The operator must either then make multiple logging passes using different receiver gain settings and thereby increase logging time, or be satisfied with the suboptimal log.

SUMMARY OF THE INVENTION

It is an object of the present invention to provide a receiver for use in an ultrasonic logging apparatus, which receiver provides rapid gain switching.

It is another object of the present invention to provide a receiver having protection from the acoustic transmitter signal, which protection will not degrade the signal-to-noise ratio.

The apparatus of the present invention includes ultrasonic transducer means, transmitter means, receiver means, and control means. The transducer means generates and receives acoustic signals. The transmitter means excites the transducer means so that the transducer means will generate an acoustic waveform. The transmitter means excites the transducer means at periodic intervals of time. The receiver means is for receiving an acoustic return from the generated acoustic waveform. The receiver means has an input which is connected with the transducer means. The receiver means receives the acoustic returns during the intervals of time between the periodic generated acoustic waveforms. The receiver means has amplifier means, and the receiver means input has input switching means. The input switching means alternates between open and closed states, wherein when the input switching means is in the closed state, a path to an electrical ground is provided which path is before said amplifier means such that said amplifier means is effectively isolated from said transducer means, and when said input switching means is in the open state, the path to electrical ground is removed such that said amplifier means is effectively coupled with said transducer means. The amplifier means amplifies the acoustic returns and includes gain switching means for changing the gain of said amplifier means. The gain switching means includes a resistive feedback network of plural resistive elements with the gain of the amplifier means being dependent upon which resistive elements are connected in feedback. The gain switching means includes plural junction field-effect transistors connected to the resistive elements. The junction field-effect transistors control which resistive elements are connected in feedback, wherein the junction field-effect transistors provide rapid gain switching of the amplifier means during an acoustic return. The control means controls the input switching means such that the input switching means is in the closed state when the transducer means generates the generated acoustic waveform and the input switching means is in the open state when the transducer means receives the acoustic return. The control means also controls the junction field-effect transistors so as to switch the gain of the amplifier means during the reception of an acoustic return.

BRIEF DESCRIPTION OF THE DRAWINGS

FIG. 1 is a schematic longitudinal cross-sectional view of a cased well borehole, showing an ultrasonic logging apparatus of the present invention therein, and supporting surface equipment, in accordance with a preferred embodiment.

FIG. 2 is a detail view of the transducer portion of the logging apparatus of FIG. 1.

DESCRIPTION OF PREFERRED EMBODIMENT

Figure 3:
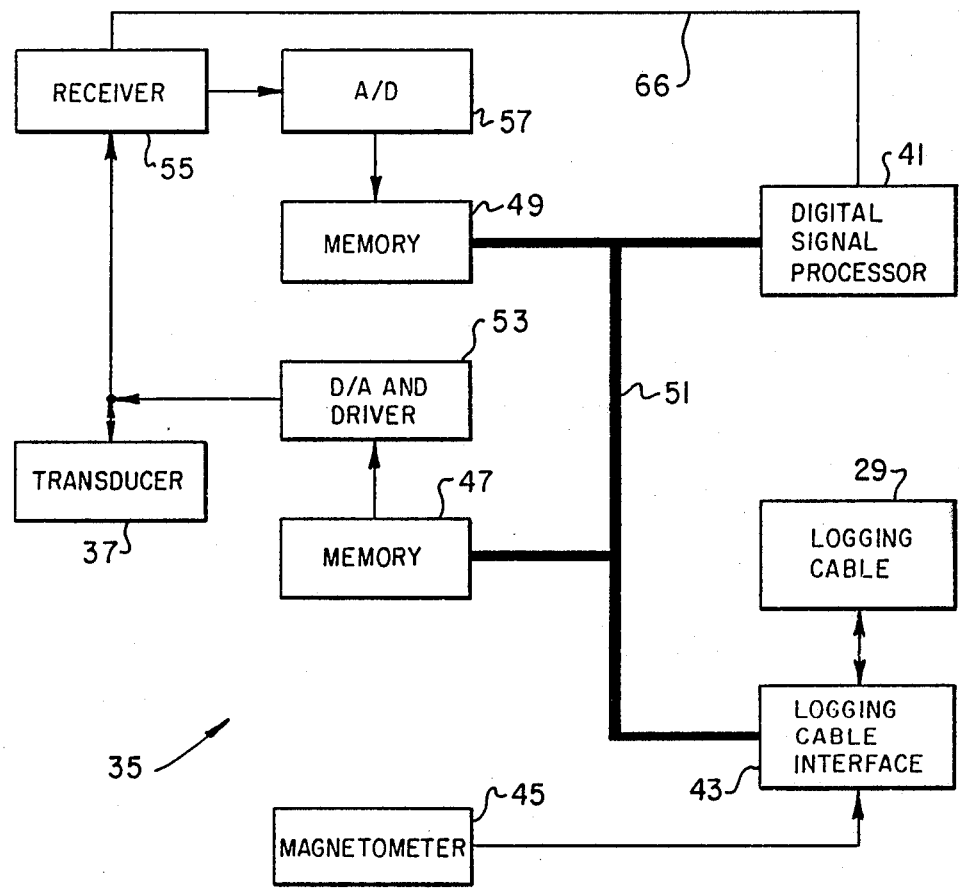
FIG. 3 is a block diagram of the downhole electronics unit which is located in the ultrasonic logging apparatus.

In FIGS. 1 and 2, there is shown a schematic longitudinal cross-sectional view of a cased well borehole 11, showing an ultrasonic logging apparatus 13 located therein, and supporting surface equipment 15, with which the present invention, in accordance with a preferred embodiment, can be practiced.

The well borehole 11, which is drilled into the earth 17, is for producing oil or natural gas. The well borehole 11 is lined with a length of casing 19. The casing wall has inner and outer surfaces 21, 23. Cement 25 fills the annulus between the casing 19 and the walls of the borehole 11, for at least some of the length of the casing. The cement 25 is used primarily to isolate one formation from another. The interior of the casing is filled with borehole fluids 27, which may be drilling mud, oil, or both. The casing has corrosion 28A on its outer surface 23 and wear 28B on its inner surface 21. Both corrosion 28A and wear 28B reduce the wall thickness of the casing 19. The logging apparatus 13 is used to measure, among other things, wall thickness, from which the presence of corrosion or wear can be inferred.

The logging apparatus 13 is located within the casing 19 and moves up or down the borehole for logging operations. The logging apparatus 13 is suspended inside of the casing by a logging cable 29, which provides electrical power and communication channels from the surface equipment 15. The logging apparatus 13 includes a transducer portion 31, a motor portion 33, and an electronics portion 35. The transducer portion 31 has an acoustical transducer 37 mounted therein. The transducer 37 is mounted so as to be directly exposed to the borehole fluids 27. The transducer 37 is oriented so as to generate acoustic waveforms which are normal to the walls of the casing 19. In the preferred embodiment, the acoustical transducer 37 has a resonant frequency of about 2 MHz and a bandwidth of about 1.0–2.5 MHz. The motor portion 33 of the logging apparatus provides the mechanical means to rotate the transducer portion 31 360 degrees within the casing. The transducer 37 can scan the entire circumference of the casing wall. The logging apparatus is centered along the longitudinal axis of the casing by centralizers 39.

Referring to FIG. 3, the electronics portion 35 of the logging apparatus 13 contains the downhole electronics, which interfaces with the transducer 37 and performs some preliminary processing of the data before transmitting the data over the logging cable 29. The electronics portion 35 includes a digital signal processor 41, a transmitter portion, a receiver portion, a logging cable interface 43, and a magnetometer 45. In the preferred embodiment, the digital signal processor 41 is a TMS320C25 CMOS (complimentary metal oxide semiconductor) integrated circuit, manufactured by Texas Instruments. The digital signal processor 41 contains some memory. The digital signal processor 41 is connected to a transmitter memory 47, a receiver memory 49, and the logging cable interface 43 by way of a data bus 51. The magnetometer 45 provides information on the azimuthal orientation of the transducer 37 inside of the borehole 11. In some cased boreholes, the magnetometer will not function because the casing shields the earth's magnetic field from the magnetometer. Under these circumstances, other types of azimuthal orientation means are used, such as a revolution counter.

The transmitter circuitry, which includes the digital signal processor 41, the transmitter memory 47, a digital-to-analog (D/A) converter and driver 53, and the transducer 37, can produce an arbitrary or programmed waveform. The digital signal processor 41 loads the transmitter memory 47 with the programmed waveform by way of the data bus 51. The programmed waveform can either be resident in downhole memory accessible by the digital signal processor, or can be transmitted from the surface via the logging cable 29 and logging cable interface 43. The transmitter memory 47 is a first-in-first-out (FIFO) memory device that outputs the digital waveform data to the D/A converter and driver 53. The D/A converter and driver 53 converts the digital waveform into an analog waveform and amplifies the waveform. The amplified waveform is sent to the transducer 37 where an acoustical waveform is generated.

Figure 5:
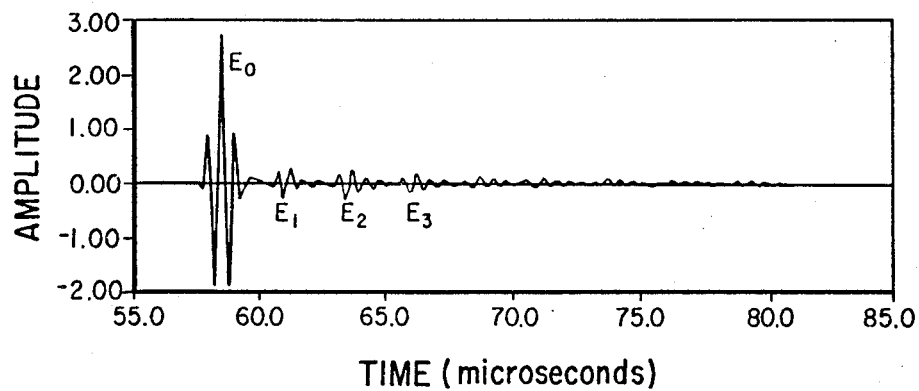
FIG. 5 is a graph showing an acoustic return of a casing wall.

The generated acoustical waveform is directed to the casing wall 19. The interaction of the generated acoustic waveform with the casing wall interfaces produces an acoustic return. Referring to FIG. 5, the acoustic return is made up of a reflection portion $E_0$, where the generated acoustic waveform is reflected off of the inner surface 21 of the casing wall, and a reverberation portion which includes wavelets $E_1$, $E_2$, $E_3$ . . . , where the generated acoustic waveform reverberates inside of the casing wall between the inner and outer surfaces 21, 23. For uncorroded casing, the reverberation portion of the acoustic return will typically contain only the relatively higher casing harmonics (e.g. 3rd or 4th harmonic) of the resonant frequency of the casing. The acoustic return is received by the transducer 37.

The receiver portion includes a receiver 55, an analog-to-digital converter (A/D) 57, the receiver memory 49, and the digital signal processor 41. The receiver 55 is connected to the transducer 37 and consequently to the D/A converter and driver 53 of the transmitter portion. The receiver 55 filters and amplifies the acoustic return. The acoustic return is sent from the receiver 55 to the A/D converter 57 where the signal is digitized. The digitized acoustic return is loaded into the receiver memory 49, which is a FIFO memory unit. The digitized acoustic return is then either processed by the digital signal processor 41 or sent uphole over the logging cable 29 by the logging cable interface 43. The digital signal processor 41 is connected to the receiver 55 with control lines 66. The digital signal processor 41 controls the gain of the receiver amplifiers and the operation of an input switching portion.

Figure 4A:
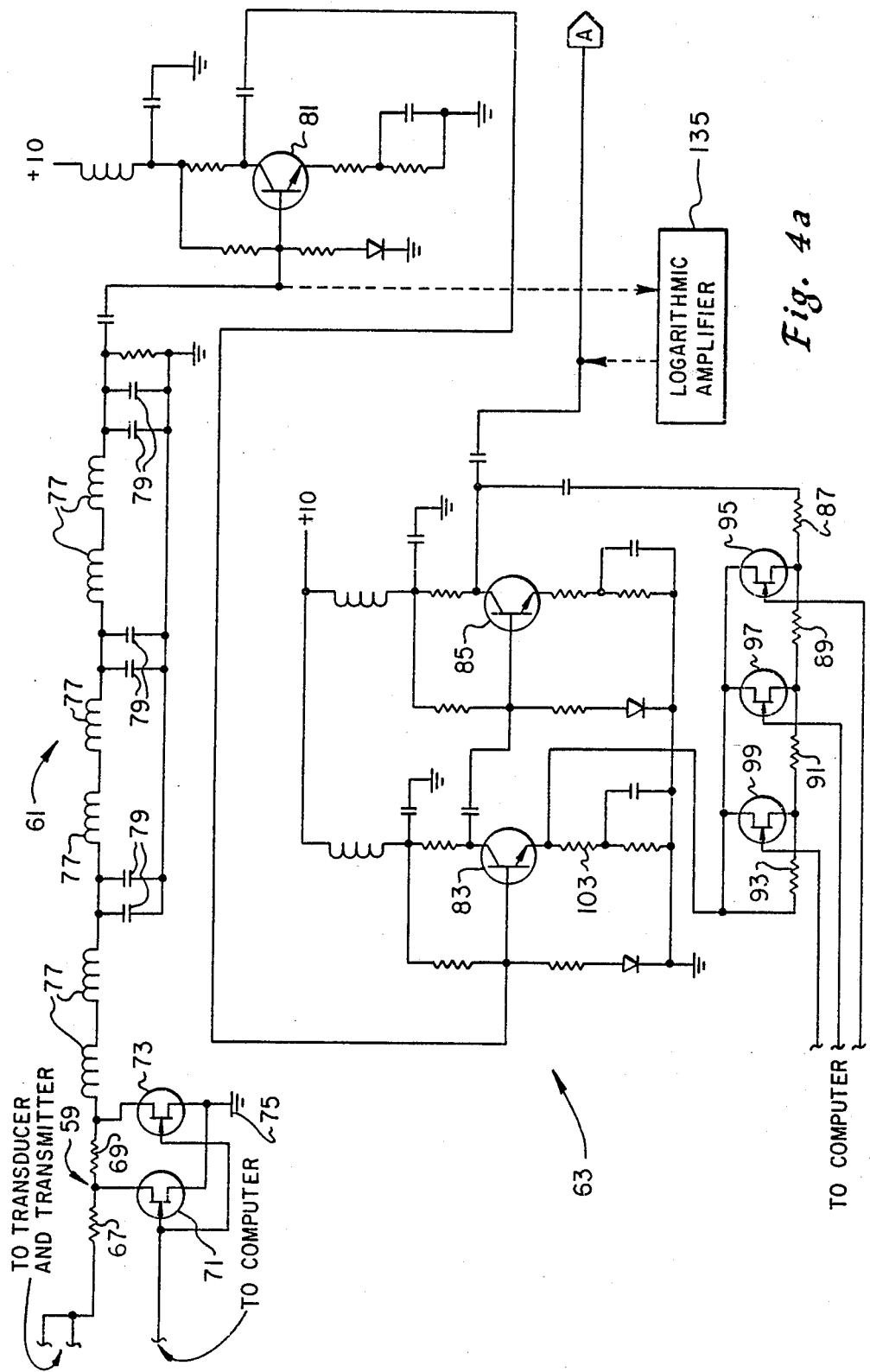
FIGS. 4A and 4B are electrical schematic diagrams of the receiver unit of the present invention, in accordance with a preferred embodiment.
Figure 4B:
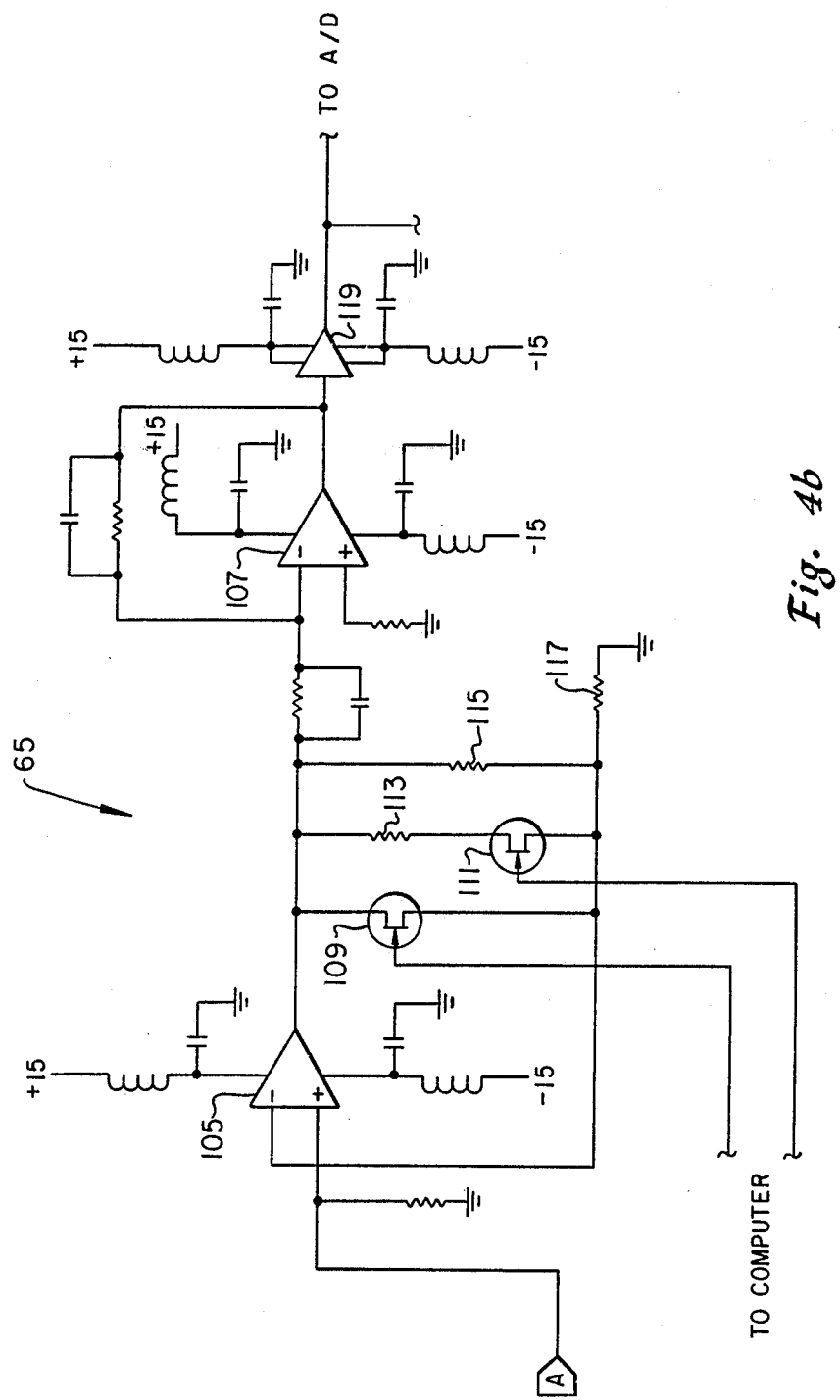

Referring to FIGS. 4A and 4B, the receiver 55 includes an input switching portion 59, an anti-aliasing filter 61, a small-signal amplifier 63, and a large-signal amplifier 65. The receiver 55 provides input protection of its amplifiers from the generated acoustic waveform produced by the acoustic transmitter portion and provides gain switching capabilities to obtain satisfactory resolution from the A/D converter 57, which digitizes the acoustic return. The design of the receiver is made difficult by the frequency range and the downhole temperatures which are encountered. The receiver should operate in the 100KHz–5MHz range in order to provide a wide bandwidth so as to accommodate transducers of various bandwidths.

Because the transducer 37 is shared by the transmitter portion and the receiver portion, with the receiver 55 input being connected to the output of the transmitter portion, the receiver requires protection of its amplifier portion during operation of the transmitter portion.

The input switching portion 59 protects the receiver amplifiers from the large generated acoustic waveforms produced by the D/A converter and driver 53. The input switching portion 59 is located at the input to the receiver 55 so as to be between the transducer 37 and the small-signal amplifier 63. The input switching portion 59 is a two stage attenuator and includes two series resistors 67, 69 and two junction field-effect transistors 71, 73. A junction field-effect transistor (JFET) 71, 73 is connected after each resistor 67, 69 to the electrical ground 75. The JFET's 71, 73 are fast switches that are controlled by the digital signal processor 41. In its closed state, each JFET provides a path to ground, effectively shorting to ground any input signal and isolating the small signal amplifier 63 from the D/A converter and driver 53 and the transducer 37. In the open state of each JFET, the path to ground is removed and the small signal amplifier 63 is effectively connected to the transducer 37 (and to the D/A converter and driver 53). The digital signal processor 41 controls the timing of the JFET operation such that the JFET's are in their closed states when the transducer 37 is being excited by the D/A converter and driver 53, and the JFET's are in their open states during the period of time that the acoustic return is expected to return to the transducer 37.

The anti-aliasing filter 61 is a passive sixth-order low pass filter, having attenuation characteristics that suit the sampling rate. In the preferred embodiment, the filter is of the Chebyshev type and has inductive elements 77 and capacitive elements 79.

The small-signal amplifier 63 provides the greatest part of the overall gain (gains of X3, X10, and X30 are typical). The small-signal amplifier 63 includes cascaded first, second, and third transistors 81, 83, 85 and a gain switching network. The first, second, and third transistors 81, 83, 85 are of the 2N3839 type which are high speed transistors. Each transistor is provided with resistors and capacitors which are used to bias the transistor in accordance with conventional practice. The gain switching network includes a series resistance network connected in feedback between the collector output of the third transistor 85 to the emitter input of the second transistor 83. The resistance network has first, second, third, and fourth resistors 87, 89, 91, 93 connected in series. Taps connected to the emitter input of the second transistor 83 are provided between the first and second resistors 87, 89, the second and third resistors 89, 91, the third and fourth resistors 91, 93, and after the fourth resistor 93. Each tap but after resistor 93 is controlled by a JFET 95, 97, 99 of the DG181AA type. The respective JFET's are fast switches, capable of switching the gain of the small signal amplifier 63 within 5 microseconds. The JFET's, which are of the same type as the input switching JFET's 71, 73, are controlled by the digital signal processor 41. The overall stage gain is determined by the ratio of the effective feedback resistance network to the emitter resistor 103 of the second transistor 83. The digital signal processor 41 controls which JFET's are in the closed state, thereby determining the placement of the taps and the effective feedback resistance in the feedback resistance network.

The small-signal amplifier 63 provides large amounts of gain, with low power consumption. The gain switching network provides the gain changes necessary for proper operation of the A/D converter 57. If the A/D converter 57 is to operate with satisfactory resolution in digitizing the signals, the signals must have amplitudes which are, at the least, in the same range. Without gain switching, large-amplitude signals (e.g. the reflection portion $E_0$) will be digitized with a different resolution than will small-amplitude signals (e.g. the reverberation portion $E_1$, $E_2$, $E_3$). To provide satisfactory resolution, gain switching is employed to maintain the signals within the resolvable range of the A/D converter 57. Thus, small-amplitude signals need more gain than large-amplitude signals. If an acoustic return contains both large-amplitude and small-amplitude signals, then the gain switching must occur within the same acoustic return. Thus, the gain switching must be very fast, so that transients generated by the gain switching die out quickly. For example, the transducer may be pulsed as high as 1500 pulses per second, wherein the transmit/receive sequence is only 667 microseconds. With the receiver of the present invention, gain switching can occur in only 5 microseconds.

The large-signal amplifier 65, which follows the small-signal amplifier 63, includes video amplifiers 105, 107. The video amplifiers 105, 107 are used to provide a small amount of low distortion gain to relatively large (one volt peak-to-peak) signals. The large-signal amplifier has a gain switching network connected in feedback to one of the video amplifiers 105, which includes JFET's 109, 111, and a network of resistors 113, 115, 117. The JFET's 109, 111, which are of the same type used in the small-signal amplifier, provide taps to various points in the network. Stage gain is determined by tap point selection by the JFET's. The JFET's 109, 111 are controlled by the digital signal processor 41 to match the output signal to the available digitizer window. A buffer amplifier 119 is provided for current gain. The output of the buffer amplifier 119 goes to the A/D converter 57.

In an alternate embodiment, a logarithmic amplifier 135 can be substituted for the small-signal amplifier. The logarithmic amplifier 135 compresses the large dynamic range of the receiver by applying less gain to large-amplitude signals and more gain to small-amplitude signals. Because of the gain characteristics of the logarithmic amplifier 135, gain switching is not required.

The logging cable interface 49 both transmits data uphole over the logging cable 29 and receives data sent downhole on the logging cable. Because of bandwidth limitations of the logging cable 29, the logging cable interface 49 may convert the digitized acoustic return into a form more suitable for transmission over the logging cable. In the preferred embodiment, the logging cable interface includes a D/A converter for converting the digitized acoustic return into an analog signal, wherein the analog acoustic return is transmitted up the logging cable.

Referring to FIG. 1, the surface equipment 15 will now be described. The surface equipment includes a logging cable interface 121, similar to the downhole logging cable interface 43. The data received from the logging apparatus 13 is sent to a receiver 123 from the logging cable interface 121, where it is filtered and amplified. The receiver 123 then sends the data to the analog mass storage unit 125, where the data is stored to await subsequent processing. The analog mass storage unit 125 can be, for example, a tape unit. The receiver 123, also sends the data to an amplitude sample and hold unit 127, so that the amplitude of the acoustic return can be monitored on the display 129 by an operator. The display 129 can also display an entire acoustic return. Conventional depth instrumentation 133 provides information on the depth of the logging apparatus. The operator can, through the operator interface 131, communicate with the logging apparatus 13 and the uphole receiver 61 to change various parameters of the equipment, such as the pulse repetition rate of the transducer and the signal transmission rate.

Although the logging apparatus has been described as operating in a cased borehole, the logging apparatus and its receiver 55 can be used in open, or uncased, boreholes.

The foregoing disclosure and the showings made in the drawings are merely illustrative of the principles of this invention and are not to be interpreted in a limiting sense.

I claim:

1. An ultrasonic logging apparatus for use in a well borehole, comprising:
   (a) ultrasonic transducer means for generating and receiving acoustic signals;
   (b) transmitter means for exciting said transducer means so that said transducer means will generate an acoustic waveform, said transmitter means connected with said transducer means, said transmitter means exciting said transducer means at periodic intervals of time;
   (c) receiver means for receiving an acoustic return from said generated acoustic waveform, said receiver means having an input, said receiver means input connected with said transducer means, said receiver means receiving said acoustic return during an interval of time between said periodic generated acoustic waveforms;
   (d) said receiver means input comprising input switching means, said receiver means comprising amplifier means, said input switching means alternating between open and closed states, wherein when said input switching means is in the closed state a path to an electrical ground is provided, which path is before said amplifier means such that said amplifier means is effectively isolated from said transducer means, and when said input switching means is in the open state the path to electrical ground is removed such that said amplifier means is effectively coupled with said transducer means;
   (e) said amplifier means comprising gain switching means for changing the gain of said amplifier means, said gain switching means comprising a resistive feedback network of plural resistive elements with the gain of said amplifier means dependent upon which resistive elements are connected in feedback; said gain switching means comprising plural junction field-effect transistors connected to said resistive elements, said junction field-effect transistors controlling which resistive elements are connected in feedback, wherein said junction field-effect transistors provide rapid switching of the gain of said amplifier means during an acoustic return;
   (f) control means for controlling said input switching means and said junction field-effect transistors, said control means controlling said input switching means such that said input switching means is in the closed state when said transducer means generates said generated acoustic waveform and said input switching means is in the open state when said transducer means receives the acoustic return, said control means controlling said junction field-effect transistors so as to switch the gain of said amplifier means during the reception of said acoustic return.

2. The apparatus of claim 1 wherein said transducer means has a resonant frequency in the range of 100 KHz to 5 MHz.

3. The apparatus of claim 1 wherein said input switching means comprises plural junction field-effect transistors connected in parallel between said receiver means input and the electrical ground.

4. An ultrasonic logging apparatus for use in a well borehole, comprising:
   (a) ultrasonic transducer means for generating and receiving acoustic signals;
   (b) transmitter means for exciting said transducer means so that said transducer means will generate an acoustic waveform, said transmitter means connected with said transducer means, said transmitter means exciting said transducer means at periodic intervals of time;
   (c) receiver means for receiving an acoustic return from said generated acoustic waveform, said receiver means having an input, said receiver means input connected with said transducer means, said receiver means receiving said acoustic return during an interval of time between said periodic generated acoustic waveforms;
   (d) said receiver means comprising said amplifier means, said amplifier means comprising gain switching means for changing the gain of said amplifier means, said gain switching means comprising a resistive feedback network of plural resistive elements with the gain of said amplifier means dependent upon which resistive elements are connected in feedback, said gain switching means comprising plural junction field-effect transistors connected to said resistive elements, said junction field-effect transistors controlling which resistive elements are connected in feedback;
   (e) control means for controlling said junction field-effect transistors so as to automatically switch the gain of said amplifier means during the reception of said acoustic return.

5. The apparatus of claim 4 wherein said receiver means further comprises analog-to-digital converter means, said control means controlling said junction field-effect transistors so as to provide sufficient gain to maintain said acoustic return within a predetermined input amplitude range of said converter means.

6. The apparatus of claim 5 wherein said control means comprises a digital computer.

7. An ultrasonic logging apparatus for use in a well borehole, comprising:
 (a) ultrasonic transducer means for generating and receiving acoustic signals;
 (b) transmitter means for exciting said transducer means so that said transducer means will generate an acoustic waveform, said transmitter means connected with said transducer means, said transmitter means exciting said transducer means at periodic intervals of time;
 (c) receiver means for receiving an acoustic return from said generated acoustic waveform, said receiver means having an input, said receiver means input connected with said transducer means, said receiver means receiving said acoustic return during an interval of time between said periodic generated acoustic waveforms;
 (d) said receiver means input comprising input switching means, said input switching means alternating between open and closed states, wherein when said input switching means is in the closed state a path to an electrical ground is provided, which path is before said amplifier means such that said amplifier means is effectively isolated from said transducer means, and when said input switching means is in the open state the path to electrical ground is removed such that said amplifier means is effectively coupled with said transducer means;
 (e) said receiver means comprising amplifier means, said amplifier means comprising gain switching means for changing the gain of said amplifier means, said gain switching means comprising plural junction field-effect transistors;
 (f) control means for controlling said input switching means and said junction field-effect transistors, said control means controlling said input switching means such that said input switching means is in the closed state when said transducer means generates said generated acoustic waveform and said input switching means is in the open state when said transducer means receives the acoustic return, said control means controlling said junction field-effect transistors so as to switch the gain of said amplifier means during the reception of said acoustic return.

* * * * *